(12) United States Patent
Kaltenbach et al.

(10) Patent No.: US 11,052,744 B2
(45) Date of Patent: Jul. 6, 2021

(54) TRANSMISSION AND METHOD FOR OPERATING AN AUTOMATIC TRANSMISSION

(71) Applicant: ZF Friedrichshafen AG, Friedrichshafen (DE)

(72) Inventors: Johannes Kaltenbach, Friedrichshafen (DE); Johannes Glückler, Friedrichshafen (DE); Christian Mittelberger, Ravensburg (DE); Kai Bornträger, Langenargen (DE); Rayk Gersten, Friedrichshafen (DE); Stefan Renner, Bodman-Ludwigshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 43 days.

(21) Appl. No.: 16/479,950

(22) PCT Filed: Jan. 25, 2018

(86) PCT No.: PCT/EP2018/051780
§ 371 (c)(1),
(2) Date: Jul. 23, 2019

(87) PCT Pub. No.: WO2018/141610
PCT Pub. Date: Aug. 9, 2018

(65) Prior Publication Data
US 2019/0344654 A1    Nov. 14, 2019

(30) Foreign Application Priority Data

Feb. 1, 2017    (DE) .................... 10 2017 201 607.8

(51) Int. Cl.
*F16H 37/04* (2006.01)
*B60K 6/365* (2007.10)
(Continued)

(52) U.S. Cl.
CPC .............. *B60K 6/365* (2013.01); *B60K 6/547* (2013.01); *F16H 3/725* (2013.01); *F16H 37/046* (2013.01);
(Continued)

(58) Field of Classification Search
CPC .. B60K 6/547; B60K 6/48; B60K 6/36; F16H 2200/0052; F16H 37/042
See application file for complete search history.

(56) References Cited

U.S. PATENT DOCUMENTS 3,572,167 A * 3/1971 Bosko et al. ......... F16H 37/042
475/218
6,085,606 A * 7/2000 Stine ....................... F16H 3/095
74/331

(Continued)

FOREIGN PATENT DOCUMENTS

DE    10 2007 010 828 A1    11/2008
DE    10 2010 043 564 A1    5/2012
(Continued)

OTHER PUBLICATIONS

German Search Report Corresponding to 10 2017 201 607.8 dated Jan. 30, 2018.

(Continued)

*Primary Examiner* — Sherry L Estremsky
(74) *Attorney, Agent, or Firm* — Finch & Maloney, PLLC; Michael J. Bujold

(57) ABSTRACT

A transmission having a main transmission and a splitter group, and including at least four spur gear planes formed with a countershaft and at least five shifting elements for engaging at least six gears between the transmission input and output shafts. When shifting between gears with the highest and the second-highest gear ratios, a shift occurs in the shifting elements associated with the splitter group but (Continued)

not in the shifting elements associated with the main transmission, whereas when shifting between gears with the lowest and second-lowest gear ratios, a shift occurs in the shifting elements associated with the main transmission but not in the shifting elements associated with the splitter group. An electric machine can be connected by a gearset, and depending on its shift position, the gearset acts as a pre-transmission ratio for the electric machine or as a superimposition transmission.

11 Claims, 7 Drawing Sheets

(51) Int. Cl.
*B60K 6/547* (2007.10)
*F16H 3/72* (2006.01)
*B60K 6/48* (2007.10)

(52) U.S. Cl.
CPC .......... *B60K 6/48* (2013.01); *F16H 2200/006* (2013.01); *F16H 2200/0052* (2013.01); *F16H 2200/0078* (2013.01); *F16H 2200/0086* (2013.01); *F16H 2200/0095* (2013.01)

(56) References Cited

U.S. PATENT DOCUMENTS

| | | | |
|---|---|---|---|
| 8,230,752 B2 | 7/2012 | Miller et al. | |
| 8,444,528 B2 | 5/2013 | Miller et al. | |
| 8,916,345 B2 | 12/2014 | Rose et al. | |
| 9,403,428 B2* | 8/2016 | Glueckler | ............... F16H 3/126 |
| 10,071,622 B2 | 9/2018 | Kaltenbach | |
| 2014/0150604 A1* | 6/2014 | Kaltenbach | ........... B60W 10/06 74/661 |
| 2018/0283549 A1 | 10/2018 | Kaltenbach | |

FOREIGN PATENT DOCUMENTS

| | | | |
|---|---|---|---|
| DE | 102010043564 A1 * | 5/2012 | ........... F16H 37/043 |
| DE | 10 2011 080 069 A1 | 1/2013 | |
| DE | 10 2012 218 367 A1 | 4/2014 | |
| DE | 10 2015 219 723 A1 | 4/2017 | |
| EP | 2 249 062 A1 | 11/2010 | |

OTHER PUBLICATIONS

International Search Report Corresponding to PCT/EP2018/051780 dated Apr. 16, 2018.
Written Opinion Corresponding to PCT/EP2018/051780 dated Apr. 16, 2018.

* cited by examiner

| Wheel Plane | 1 | 2 | 3 | 4 | 5 |
|---|---|---|---|---|---|
| i | -1.21 | -0.83 | -1.00 | -2.59 | 2.40 |

| | A | B | C | D | E | R | i | phi | |
|---|---|---|---|---|---|---|---|---|---|
| 1. Gear | X | | | | X | | 3.13 | 1.46 | phi2 |
| 2. Gear | | X | | | X | | 2.14 | 1.46 | |
| 3. Gear | X | | X | | | | 1.46 | 1.21 | |
| 4. Gear | X | | | X | | | 1.21 | 1.21 | phi1 |
| 5. Gear | | X | X | | | | 1.00 | 1.21 | |
| 6. Gear | | X | | X | | | 0.83 | | |
| R1 | X | | | | | X | -2.90 | 1.46 | |
| R2 | | X | | | | X | -1.98 | | |

| | A | B | C | D | E | R | L | H | i | phi |
|---|---|---|---|---|---|---|---|---|---|---|
| 1. Gear | X | | | | X | | X | | 14.42 | 1.46 |
| 2. Gear | | X | | | X | | X | | 9.84 | 1.46 |
| 3. Gear | X | | X | | | | X | | 6.74 | 1.21 |
| 4. Gear | X | | | X | | | X | | 5.57 | 1.21 |
| 5. Gear | | X | X | | | | X | | 4.60 | 1.21 |
| 6. Gear | | X | | X | | | X | | 3.80 | 1.21 |
| 7. Gear | X | | | | X | | | X | 3.13 | 1.46 |
| 8. Gear | | X | | | X | | | X | 2.14 | 1.46 |
| 9. Gear | X | | X | | | | | X | 1.46 | 1.21 |
| 10. Gear | X | | | X | | | | X | 1.21 | 1.21 |
| 11. Gear | | X | X | | | | | X | 1.00 | 1.21 |
| 12. Gear | | X | | X | | | | X | 0.83 | |
| R1 | X | | | | | X | X | | -13.36 | |
| R2 | | X | | | | X | X | | -9.12 | |
| R3 | X | | | | | X | | X | -2.90 | |
| R4 | | X | | | | X | | X | -1.98 | |

| Wheel Plane | 1 | 2 | 3 | 4 | 5 |
|---|---|---|---|---|---|
| i | -1.29 | -1 | -0.88 | -1.66 | -2.77 |

| | A | B | C | D | E | F | i | phi | |
|---|---|---|---|---|---|---|---|---|---|
| 1. Gear | X | | | | | X | 3.57 | 1.29 | ⎫ |
| 2. Gear | | X | | | | X | 2.77 | 1.29 | ⎬ phi2 |
| 3. Gear | X | | | | X | | 2.14 | 1.29 | ⎬ |
| 4. Gear | | X | | | X | | 1.66 | 1.29 | ⎭ |
| 5. Gear | X | | X | | | | 1.29 | 1.14 | ⎫ |
| 6. Gear | X | | | X | | | 1.14 | 1.14 | ⎬ phi1 |
| 7. Gear | | X | X | | | | 1.00 | 1.14 | ⎭ |
| 8. Gear | | X | | X | | | 0.88 | | |

| | A | B | C | D | E | F | L | H | i | phi |
|---|---|---|---|---|---|---|---|---|---|---|
| 1. Gear | X | | | | | X | X | | 16.47 | 1.29 |
| 2. Gear | | X | | | | X | X | | 12.77 | 1.29 |
| 3. Gear | X | | | | X | | X | | 9.87 | 1.29 |
| 4. Gear | | X | | | X | | X | | 7.65 | 1.29 |
| 5. Gear | X | | X | | | | X | | 5.95 | 1.14 |
| 6. Gear | X | | | X | | | X | | 5.23 | 1.14 |
| 7. Gear | | X | X | | | | X | | 4.61 | 1.14 |
| 8. Gear | | X | | X | | | X | | 4.06 | 1.14 |
| 9. Gear | X | | | | | X | | X | 3.57 | 1.29 |
| 10. Gear | | X | | | | X | | X | 2.77 | 1.29 |
| 11. Gear | X | | | | X | | | X | 2.14 | 1.29 |
| 12. Gear | | X | | | X | | | X | 1.66 | 1.29 |
| 13. Gear | X | | X | | | | | X | 1.29 | 1.14 |
| 14. Gear | X | | | X | | | | X | 1.14 | 1.14 |
| 15. Gear | | X | X | | | | | X | 1.00 | 1.14 |
| 16. Gear | | X | | X | | | | X | 0.88 | |

| Wheel Plane | 1 | 2 | 3 | 4 |
|---|---|---|---|---|
| i | -1.21 | -0.83 | -1.46 | -2.59 |

| | A | B | C | D | E | i | phi | |
|---|---|---|---|---|---|---|---|---|
| 1.Gear | X | | | | X | 3.13 | 1.46 | phi2 |
| 2.Gear | | X | | | X | 2.14 | 1.21 | |
| 3.Gear | X | | | X | | 1.77 | 1.21 | phi1 |
| 4.Gear | X | | X | | | 1.46 | 1.21 | |
| 5.Gear | | X | | X | | 1.21 | 1.21 | |
| 6.Gear | | X | X | | | 1.00 | | |

| Wheel Plane | 1 | 2 | 3 | 4 | 5 |
|---|---|---|---|---|---|
| i | -1.29 | -1.00 | -1.14 | -1.66 | -2.77 |

| | A | B | C | D | E | F | i | phi | |
|---|---|---|---|---|---|---|---|---|---|
| 1.Gear | X | | | | | X | 3.57 | 1.29 | ⎫ |
| 2.Gear | | X | | | | X | 2.77 | 1.29 | ⎬ phi2 |
| 3.Gear | X | | | | X | | 2.14 | 1.29 | ⎭ |
| 4.Gear | | X | | | X | | 1.66 | 1.13 | ⎫ |
| 5.Gear | X | | | X | | | 1.47 | 1.14 | ⎬ phi1 |
| 6.Gear | X | | X | | | | 1.29 | 1.14 | |
| 7.Gear | | X | | X | | | 1.14 | 1.14 | ⎭ |
| 8.Gear | | X | X | | | | 1.00 | | |

TRANSMISSION AND METHOD FOR OPERATING AN AUTOMATIC TRANSMISSION

This application is a National Stage completion of PCT/EP2018/051780 filed Jan. 25, 2018, which claims priority from German patent application serial no. 10 2017 201 607.8 filed Feb. 1, 2017.

FIELD OF THE INVENTION

The present invention relates to a transmission and a method for operating an automatic transmission or an automated transmission having a main transmission and a splitter group.

BACKGROUND OF THE INVENTION

For example, a method for operating a drive-train is known from the document EP 2 249 0 62 A1. The drive-train comprises a group transmission with a multi-gear main transmission. A front-end group or splitter group is connected upstream from the main transmission and a range group downstream from it. By means of the, for example, 2-step splitter group the gear intervals of the main transmission are halved and the total number of gears available from the group transmission is doubled. By means of the, for example, 2-step downstream range group the total number of gears available is again doubled. With the front-end group and the main transmission the group transmission has a plurality of spur gear planes and a plurality of shifting elements associated with the spur gear planes in order to produce several gear ratio steps. Each spur gear plane comprised a spur gearwheel in the form of a loose wheel associated with the transmission input shaft or main shaft, which meshes respectively with a spur gearwheel associated with the countershaft. By means of the shifting elements provided, the loose wheels can be connected to the transmission input shaft or main shaft.

Automated change-speed transmissions with 12 gears or 16 gears and with a splitter group, a main group and a range group, are preferably used in trucks. The above-described group transmission has geometrically designed gear intervals, i.e. essentially the same gear intervals exist between two adjacent gears. The splitter group divides the gear steps of the main transmission into two gear steps. The downstream range group enables the existing gear steps to be doubled.

A truck, for example used for long-haul journeys, moves at almost constant speed on motorways. On level ground, for fuel-consumption reasons a low engine rotational speed is desirable. However, on uphill slopes downshifts are needed to increase the engine rotational speed and thus also the drive power. For such a gear change to the gears with lower gear ratios, for example in a 12-gear transmission between gears 10 and 12, a small gear interval would be advantageous in order to be able to always drive as close as possible to the consumption optimum of the internal combustion engine. In the case of the transmission described above with geometrical gear intervals, however, if the gear intervals are made smaller so also is the overall spread of the transmission made substantially smaller, which is a disadvantage.

In a not-yet-published application by the present applicant, which bears the same file number DE 10 2015 219 723.9, a transmission and a method for operating an automatic transmission are described, the transmission having a main transmission and a splitter group with at least four spur gear planes and at least five shifting elements associated with the spur gear planes for producing at least six gear steps. To obtain a progressive gear sequence with approximately the same transmission spread, the gear interval in a gearshift between the gears with the lowest gear ratio and the second-lowest gear ratio is made smaller than the gear interval between the gears with the highest gear ratio or the second-highest gear ratio. This is achieved in that in a gearshift between the gears with the lowest and second-lowest gear ratios, the shifting elements used which are associated with the splitter group are not changed, whereas the shifting element used and associated with the main group is changed, and in a gearshift between the gears with the highest and second-highest gear ratios the shifting element used which is associated with the main transmission is not changed, whereas the shifting element used and associated with the splitter group is changed.

SUMMARY OF THE INVENTION

The purpose of the present invention is to propose a transmission and a method for operating the transmission, which is characterized by a progressive gear sequence with approximately constant transmission spread and which in addition demands as little structural effort and expense as possible, and by improved efficiency.

According to the invention, this objective is achieved by the features specified in the independent claim(s). Advantageous further developments emerge from the subordinate claims, the description and the drawings.

Thus, in the context of the invention a transmission and a method for operating an automated transmission are proposed. The transmission comprises a main transmission and at least one splitter group, which together comprise at least four spur gear planes formed with at least one countershaft and at least five shifting elements associated with the spur gear planes for engaging at least six gears between a transmission input shaft and a transmission output shaft, wherein for a gearshift between gears with the highest and second-highest gear ratios a shifting element change with the shifting elements associated with the splitter group takes place but no shifting element change of the shifting elements associated with the main transmission takes place, and wherein for a gearshift between gears with the lowest and second-lowest gear ratios a shifting element change of the shifting elements associated with the main transmission takes place but no shifting element change of the shifting elements associated with the front-end group takes place. In particular, in order to obtain an improved efficiency of the transmission having a progressive gear sequence, it is provided that at least one switchable electric machine that can be connected by means of a gearset is included, such that depending on its switching position, the gearset acts as a pre-transmission ratio for the electric machine or as a superimposition transmission.

In this way the automated change-speed transmission proposed, with its progressive gear sequence, comprises an electric machine which can be connected by means of a gearset, so that an otherwise necessary conventional starting clutch can be omitted. Furthermore, with the transmission an electrodynamic starting function (EDS) and an electrodynamic powershift function (EDP) are made available. Besides purely electric starting, electric synchronization of the transmission is also possible. Moreover, during hybrid operation traction-force-assistance is also possible. Overall therefore, a transmission costing little and with high efficiency is obtained, also having a suitable spread and gears, for example, for use in long-haul trucks.

Alongside the transmission proposed according to the invention a method is also claimed for the operation of an automated transmission with a main transmission and at least one splitter group for engaging at least six gears, such that for a gearshift between the gears with the lowest and second-lowest gear ratios a shifting element used and associated with the splitter group is not changed, whereas a shifting element used and associated with the main transmission is changed, and at least for a gearshift between gears with the highest and the second-highest gear ratios, a shifting element used and associated with the main transmission is not changed whereas a shifting element used and associated with the splitter group is changed, and wherein at least one electric machine can be connected by way of a gearset in such manner that depending on its connection, the gearset is used as a pre-transmission ratio for the electric machine or as a superimposition transmission.

According to a particularly advantageous further development of the method according to the invention, the method can be applied with the transmission also claimed according to the invention.

BRIEF DESCRIPTION OF THE DRAWINGS

Below, the present invention is explained in greater detail with reference to the drawings, which show.

DETAILED DESCRIPTION OF THE PREFERRED EMBODIMENTS

Figures 1, 1A, 1B:
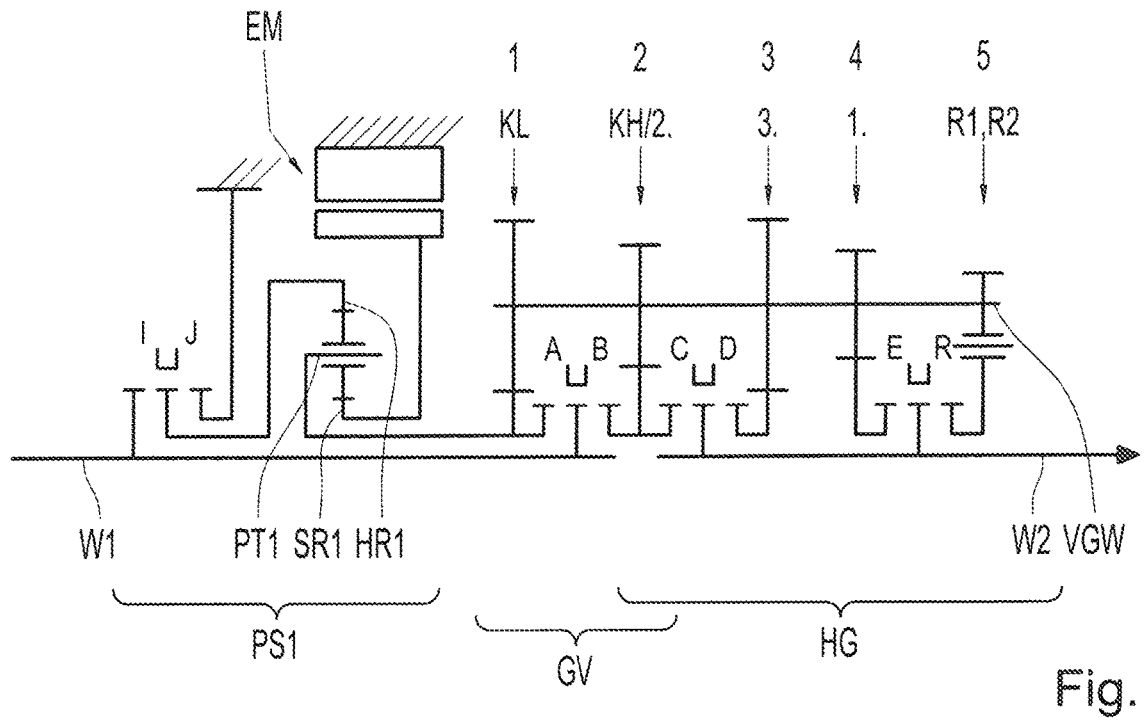
FIG. 1: A representation of the principle of a gearset layout of an automated transmission.
FIG. 1A: Fixed gear ratios of the wheel planes of the gearset layout according to FIG. 1.
FIG. 1B: A shifting matrix for the gearset layout according to FIG. 1.

FIGS. 1 to 7 show examples of various gearset layouts of an automated transmission, with reference to which the invention will be described for exemplary purposes. The gearset layouts comprise a main transmission HG and an upstream splitter group GV, as well as an electric machine EM which can be connected by way of a planetary gearset PS1, whereas the downstream range group GP also shown is not necessarily required for the purposes of the invention. Furthermore, the representations in principle show in each case only half of the gearset. By mirror reflection in an axis of a transmission input shaft W1 and a transmission output shaft W2, a gearset is produced which, for example, has two countershafts VGW whereas in principle one countershaft VGW is sufficient.

Regardless of the respective embodiments of the gearset according to the invention, it is provided that at least four or at most five spur gear planes 1, 2, 3, 4, 5 formed with at least one countershaft VGW and five shifting elements A, B, C, D, E, F associated with the spur gear planes 1, 2, 3, 4, 5 for engaging at least six gears between the transmission input shaft W1 and the transmission output shaft W2 are provided, wherein for a gearshift between the gears with the highest and the second-highest gear ratios a shifting element change of the shifting elements A, B associated with the front-end group VG takes place, but no shifting element change of the shifting elements C, D, E, F associated with the main transmission takes place, whereas for a gearshift between the gears with the lowest and second-lowest gear ratios a shifting element change of the shifting elements C, D, E, F associated with the main transmission HG takes place but there is no shifting element change of the shifting elements A, B associated with the front-end group VG, and wherein at least one shiftable electric machine EM that can be connected by means of a gearset is provided, such that depending on its shift position the gearset acts as a pre-transmission ratio for the electric machine EM or as a superimposition transmission. The gearset is in the form of a planetary gearset PS1, wherein a ring gear HR1 of the planetary gearset PS1 can be connected by a second switching element J to a housing as a pre-transmission ratio for the electric machine EM, or the ring gear HR can be connected by a first switching element I to a transmission input shaft W1 as a superimposition transmission, wherein a planetary carrier PT1 is connected to a first spur gear plane 1 and can be connected to the transmission input shaft W1 by means of a first shifting element A, and wherein a sun gear SR1 is connected to the rotor of the electric machine EM.

This produces a gearset with progressive gear steps, although it is a group transmission with effective utilization of the only five spur gear planes 1, 2, 3, 4, 5 provided. The planetary gearset PS1 is used in two ways: on the one hand as a pre-transmission ratio for the electric machine EM, for example when the associated second switching element J is closed, and on the other hand as a superimposition transmission when the associated first switching element I is closed. The shifts in the splitter group GV when the shifting elements A, B are changed are powershiftable when the gear in the main transmission HG remains the same, i.e. the shifting elements C, D, E, R remain in their current shift positions. Optionally, an electrodynamic superimposition (EDS) is available when the first switching element I is closed (the shifting elements A, B are synchronized with superimposition at the planetary gearset PS1). Optionally, traction force support is also possible exclusively by the electric machine EM when the second switching element J is closed (the shifting elements A, B are synchronized with the internal combustion engine alone). Moreover, the shifts between the gears first and second gear and third to fifth gear and fourth to sixth gear, are powershiftable. In the event of larger accelerations or decelerations it can be appropriate to miss out a gear.

The shifting elements provided can for example be in the form of unsynchronized claw-type shifting elements. In traction-force-interrupted shifts in the main transmission HG the new gear (shifting elements C, D, E, R) can be synchronized with the help of the electric machine EM. Optionally also electrodynamically with superimposition when the first switching element I is closed (the shifting elements A, B being open) or optionally alone with the electric machine EM when the second switching element J is closed (the shifting elements A, B being open).

Furthermore purely electric driving is possible when the second switching element J is closed (no separator clutch for the internal combustion engine being required). For this the first gear, the third gear, the fourth gear and the reversing gear R1 are available when the shifting elements A, B are open. Particularly advantageously, the first gear and the reversing gear R1 can be used to produce a maximum starting torque.

Moreover electrodynamic staring (EDA) is possible when the first switching element I is closed. For this the first gear, the third gear, the fourth gear and the reversing gear R1 are available when the shifting elements A, B are open. Particularly advantageously, here too the first gear and the reversing gear R1 can be used to produce a maximum starting torque.

In addition the electric machine EM can also be connected to a drive motor or internal combustion engine without a power flow existing at the drive output. This produces various functions, namely the engine start and charging of the energy accumulator in neutral, and when shifting elements J and A are closed the electric machine EM is connected through to the internal combustion engine by way of the planetary gearset PS1 and additionally via the splitter group GV. This makes for an advantageous engine start, since the electric machine EM requires very little torque. Furthermore, several reversing gear ratios R1 to R4 with large gear intervals are available.

Consequently, with the gearset proposed an arrangement with an electric machine EM via the planetary gearset PS1 and the switching elements I/J of the planetary gearset PS1 is obtained. Additional advantages emerge from the shifting matrix. In shifts between the highest and second-highest gear ratios, i.e. between the first and second gears, the two shifting elements A, B of the splitter group GV change whereas in the main transmission HG all the shifting elements C, D, E, F, R hold their positions, while for shifts between the second-lowest and the lowest gear ratios, i.e. for example between the fifth and sixth gears, the shifting elements of the main transmission HG change whereas the shifting elements of the splitter group GV remain in position.

Regardless of the various gearset designs it is provided that to obtain the gear step with the highest gear ratio, the first shifting element A associated with the splitter group GV and the fifth or sixth shifting element E or F associated with the main transmission HG are closed, and to obtain the gear step with the second-highest gear ratio, the second shifting element B associated with the splitter group GV and the fifth or sixth shifting element E or F associated with the main transmission HG are closed. Furthermore, it is provided that to obtain the gear step with the second-lowest gear ratio, the second shifting element B associated with the splitter group GV and the third or fourth shifting element C or D associated with the main transmission HG are closed, and to obtain the gear step with the lowest gear ratio, the second shifting element B associated with the splitter group GV and the third or fourth shifting element C or D associated with the main transmission HG are closed.

With reference to the specific gearset designs, for example from FIG. 1 it emerges that between the lowest gears 1 and 2 there are large, or larger gear intervals phi 2 with a value of around 1.46, whereas between the highest gears 3 to 5 the gear intervals phi 1 are smaller with a value of around 1.21. Regardless of these a large total spread overall is obtained, which can reach approximately the maximum for a geometric gradation.

In FIG. 1 the gearset is represented as a progressive six-gear transmission with an overdrive gear OD and a reversing gear R1, R2. In this case the splitter group GV and the main transmission HG comprise a total of five spur gear planes 1 to 5, with which 6 shifting elements A, B, C, D, E, R are associated in order to bring the spur gearwheels of the countershaft VGW and the transmission input shaft W1 or the transmission output shaft W2 into connection with one another. In the gearset design illustrated no additional countershaft VGW is provided, although one could be provided optionally. Associated with the main transmission HG are the first gear 1, the second gear 2, the third gear 3 and the reversing gears R1, R2, whereas with the splitter group GV is associated the first spur gear plane 1 with the drive input constant KL of the splitter group GV in the slow mode. The second spur gear plane 2 is jointly associated both with the splitter group GV as the drive input constant KH of the splitter group in the fast mode and also with the main transmission HG for the second gear 2. The third, fourth and fifth wheel planes 3, 4, 5 are associated with the main transmission HG.

FIG. 1A shows as examples the stationary gear ratios for the individual spur gear planes 1 to 4. The stationary gear ratios indicated in each case correspond to the respective gear-tooth ratio between the spur gears of the spur gear planes 1 to 4 concerned.

FIG. 1B shows as examples the gear ratios i for the gearset design shown in FIG. 1. In addition, the gear intervals phi provided between the gears shown and the overall spread are indicated. Furthermore, the shifting elements A, B, C, D, E, R which are closed in order to obtain the respective gears are indicated by corresponding crosses in the table. To obtain with this transmission a progressive gear sequence while the overall spread remains the same, at least in a gearshift between the gears with the lowest and second-lowest gear ratios i a smaller gear interval phi1 is provided than the gear interval phi2 in a gearshift between the gears with the highest and the second-highest gear ratios.

Figures 2, 2A:
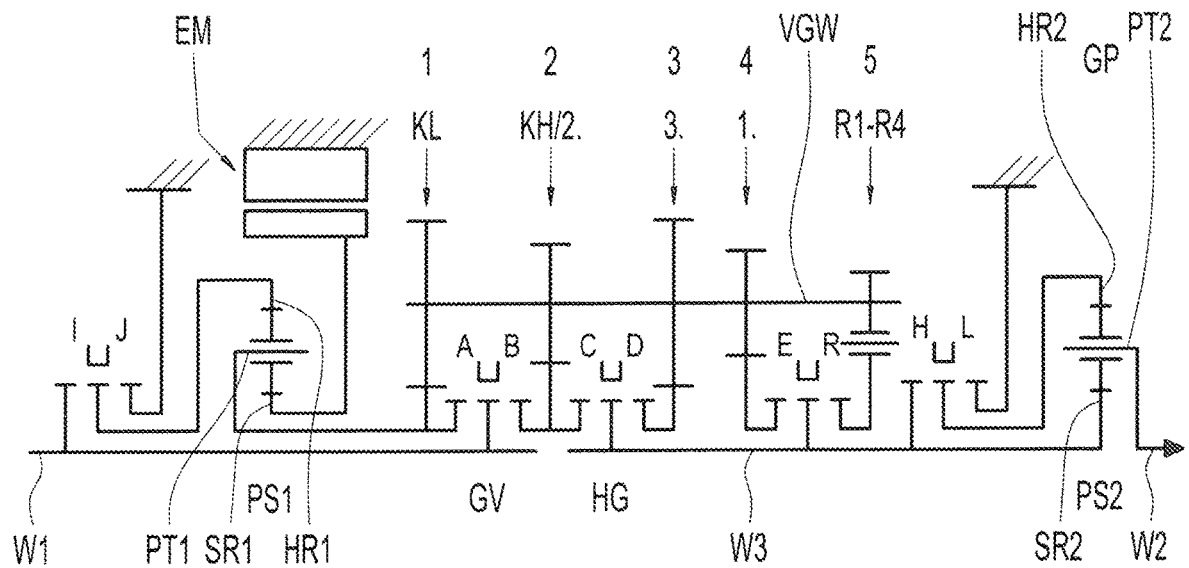
FIG. 2: A representation of the principle of a further gearset layout of the automated transmission according to FIG. 1, with a downstream range group.
FIG. 2A: A shifting matrix for the gearset layout according to FIG. 2.

FIG. 2 shows as an example a further embodiment of the transmission according to the invention in the form of a 12-gear transmission with an overdrive gear and four reversing gears R1 to R4. Otherwise than in the embodiment according to FIG. 1, downstream from the main transmission HG there is a range group GP in the form of a planetary gearset PS2 with a first range switching element L and a second range switching element H, so that at least four to six further gears can be obtained. In addition a main shaft W3 is associated with the main transmission HG and the range group GP. In this case it is provided that a planetary carrier PT2 of the planetary gearset PS2 is connected to the transmission output shaft W2, while a sun gear SR2 is connected to the main shaft W3. When the range shift element L is closed a ring gear HR2 of the planetary gearset PS2 is connected to the housing, and when the range shift element H is closed the ring gear is connected to the main shaft W3.

With this embodiment the fourth gear and the sixth gear can be omitted so that from the first gear to the eighth gear there is a constant gear interval phi. This then corresponds to an overall progressive gear sequence up to the twelfth gear when only ten gears are used. The gear ratio of the range group GP can even be increased in order to further increase the spread. The gear interval when shifting the range group between the sixth gear and the seventh gear is then increased correspondingly.

Example gear ratios i are shown in the shifting matrix of FIG. 2A. These example gear ratios apply when the range group GP provides the gear ratios 4, 6 (the stationary gear ratios i0 of the range group GP are then −3, 6).

Figure 3:
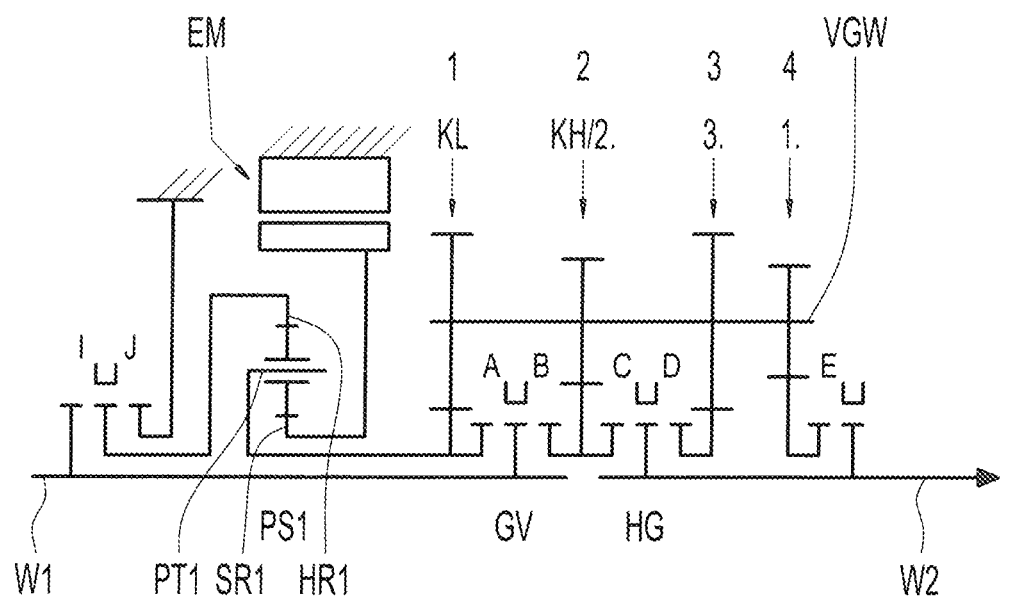
FIG. 3: A representation of the principle of a further gearset layout of the automated transmission according to FIG. 1, without a reversing gear.

FIG. 3 shows as an example a gearset in the form of a progressive 6-gear transmission with an overdrive gear but without a reversing gear as in FIG. 1. Consequently the gearset according to FIG. 3 corresponds to the gearset shown in FIG. 1, except only that the fifth wheel plane 5 for the reversing gear and the shifting element R concerned are omitted. In this embodiment driving in reverse is possible exclusively purely electrically, when the shifting elements J and E are closed so that the first gear 1 is used purely electrically. This has the advantage that the structural complexity and structural length are substantially reduced. The embodiment according to FIG. 3 can also be supplemented with a downstream range group GP without problems.

Figures 4, 4A, 4B:
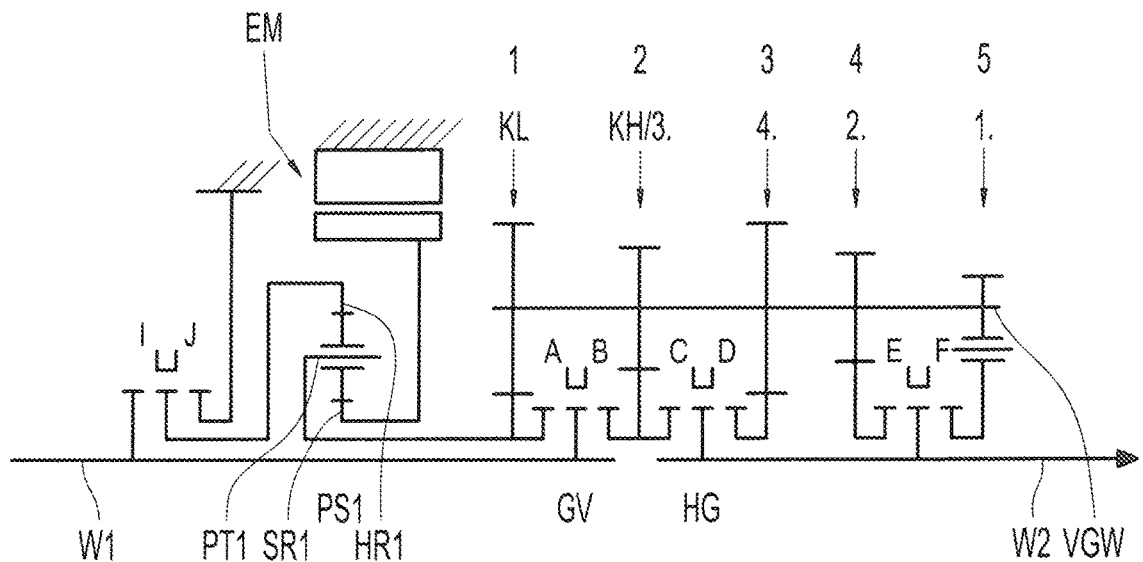
FIG. 4: A representation of the principle of a further gearset layout of the automated transmission.
FIG. 4A: Stationary gear ratios of the wheel planes of the gearset layout according to FIG. 4.
FIG. 4B: A shifting matrix for the gearset layout according to FIG. 4.

FIG. 4 shows a progressive 8-gear gearset embodiment with an overdrive gear, without a reversing gear. This embodiment corresponds to the embodiment according to FIG. 1 but differs therefrom in that the wheel plane 5 for the reversing gear is used for an additional forward gear. Thus, there are 2×4 or 8 forward gears.

Other than the advantages mentioned in connection with FIG. 1, with the embodiment according to FIG. 4 the following shifts can be carried out with powershifting, namely 1-2, 3-4, 5-7 and 6-8. Moreover, with purely electrical driving the gears 1, 3, 5 and 6 are available. The first gear can be used particularly advantageously. For electro-dynamic starting, the gears 1, 3, 5, 6 are available, while in this case the first gear can also be used particularly advantageously in order to obtain a maximum starting torque. In other respects the advantages are the same as for the embodiment according to FIG. 1.

FIG. 4A shows example stationary gear ratios of the individual spur gear steps 1, 2, 3, 4, 5. For the first and second wheel planes 1, 2 these gear ratios are viewed from the drive input shaft or transmission input shaft W1 toward the countershaft VGW, and for the third, fourth and fifth wheel planes 3, 4, 5 they are viewed from the countershaft VGW toward the transmission drive output shaft W2, wherein a negative sign indicates the rotation direction reversal.

FIG. 4B shows as examples the gear ratios i in the form of a shifting matrix for the embodiment according to FIG. 4, the constant gear intervals being denoted as phi 1 and phi 2.

Figures 5, 5A:
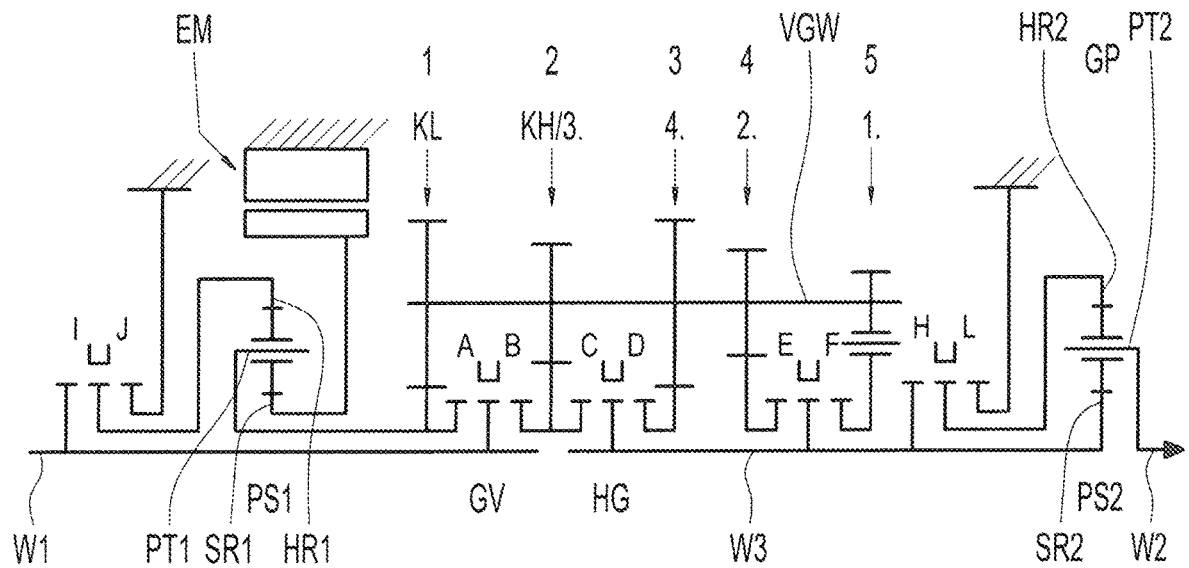
FIG. 5: A representation of the principle of a further gearset layout of the automated transmission according to FIG. 1, with a downstream range group.
FIG. 5A: A shifting matrix for the gearset layout according to FIG. 5.

FIG. 5 shows an example of a further embodiment in the form of a progressive 16-gear transmission with an overdrive gear but without a reversing gear. This design corresponds to the embodiment according to FIG. 4, but with a downstream range group GP, so that the number of gears is doubled. The sixth and eighth gears can be omitted, so that a constant gear interval is obtained from the first gear to the twelfth gear. This then corresponds to an overall progressive gear sequence up to the sixteenth gear, wherein only 14 gears are used. The gear ratio of the range group GP can also be increased in order to obtain a larger spread. The gear interval phi when the range group is shifted from the eighth gear to the ninth gear then becomes correspondingly larger.

FIG. 5A shows a corresponding shifting scheme indicating example gear ratios i. The gear ratios i shown apply when the range group GP provides the gear ratio 4.61, and the stationary gear ratio i0 of the range group GP is then minus 3.61.

Figures 6, 6A, 6B:
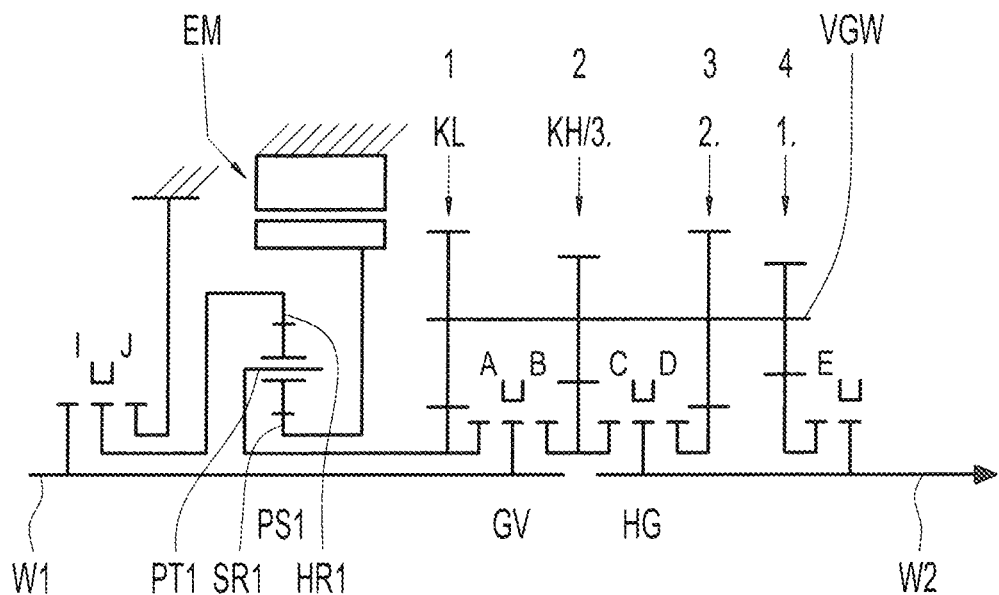
FIG. 6: A representation of the principle of a further gearset layout of the automated transmission according to FIG. 3, as a direct gear transmission.
FIG. 6A: Stationary gear ratios of the wheel planes of the gearset layout according to FIG. 6.
FIG. 6B: A shifting matrix for the gearset layout according to FIG. 6.

FIG. 6 shows as an example, an embodiment in the form of a 6-gear transmission with a direct gear and without a reversing gear. This embodiment corresponds to the embodiment according to FIG. 3, but with a direct gear, i.e. the gear ratio of the highest gear is 1. There are fewer large and more small gear intervals phi than in the overdrive variant. In this case it is possible for the embodiment according to FIG. 6 also to be made with a downstream range group GP. Moreover, it is also conceivable that a reversing gear ratio is added, for example as in the embodiment according to FIG. 1.

FIG. 6A shows as examples the stationary gear ratios of the wheel planes 1 to 4, wherein for the first and second wheel planes 1, 2 the gear ratio should be viewed from the transmission input shaft W1 toward the countershaft VGW while for the third and fourth wheel planes 3 and 4 the gear ratios should be viewed from the countershaft VGW toward the transmission output shaft W2, and the negative sign relates to the rotation direction reversal.

FIG. 6B shows as an example a corresponding shifting scheme for the embodiment according to FIG. 6.

Figures 7, 7A, 7B:
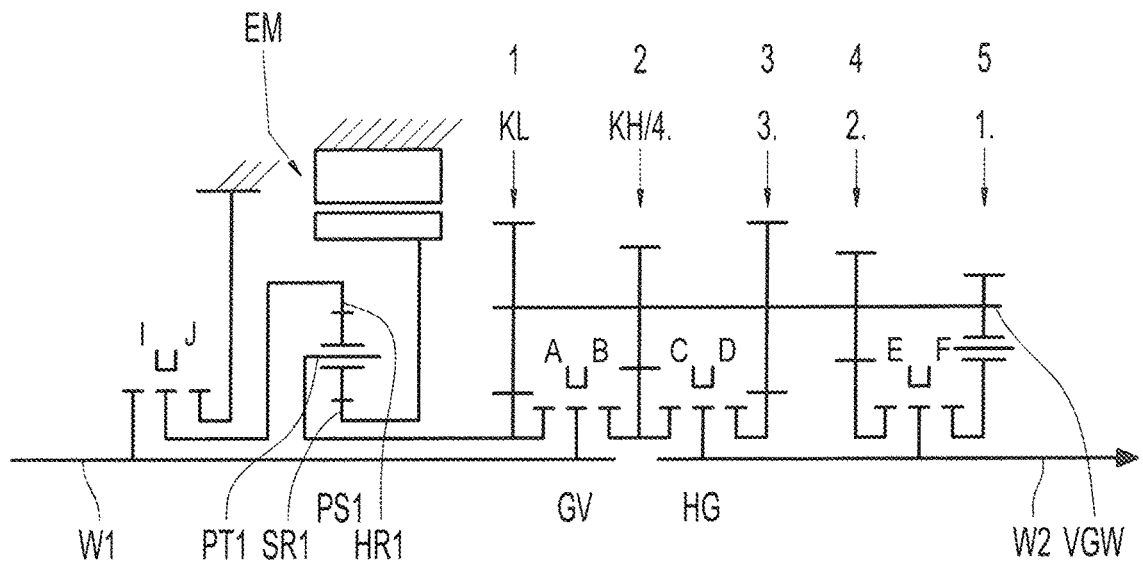
FIG. 7: A representation of the principle of a further gearset layout of the automated transmission according to FIG. 4, as a direct-gear transmission.
FIG. 7A: Stationary gear ratios of the wheel planes of the gearset layout according to FIG. 7.
FIG. 7B: A shifting matrix for the gearset layout according to FIG. 7.

FIG. 7 shows a further embodiment in the form of a progressive 8-gear transmission with no reversing gear but a direct gear. This embodiment corresponds to the embodiment of FIG. 4, but only as a direct-gear embodiment because the highest gear has a gear ratio of 1. There are fewer large and more small gear intervals phi than with an overdrive gear variant. Here it is possible to provide a downstream range group GP.

FIG. 7A again shows the stationary gear ratios of the individual spur gear steps or wheel planes 1 to 5. For the first and second wheel planes 1, 2 the gear ratios should be viewed from the transmission input shaft W1 toward the countershaft VGW and for the third, fourth and fifth wheel planes 3, 4, 5 the gear ratios should be viewed from the countershaft VGW toward the drive output shaft W2, the negative sign relating to the rotation direction reversal.

FIG. 7B shows a corresponding shifting matrix for the embodiment according to FIG. 7.

Besides the transmissions claimed, also claimed is a method according to the invention for operating an automated transmission with a main transmission HG and at least one splitter group GV for engaging at least six gear steps, wherein for a gearshift between the gears with the lowest and the second-lowest gear ratios a shifting element A, B used and associated with the splitter group GV is not changed and a shifting element C, D, E, F used and associated with the main transmission is changed, whereas for a gearshift between gears with the highest and the second-highest gear ratios a shifting element C, D, E, F, used and associated with the main transmission HG is not changed and a shifting element A, B used and associated with the splitter group GV is changed, and wherein at least one electric machine EM can be connected by means of a gearset in such manner that depending on its connection, the gearset is used as a pre-transmission ratio for the electric machine EM or as a superimposition transmission.

As the gearset a planetary gearset PS1 is used, wherein a ring gear HR1 of the planetary gearset PS1 is connected by means of a closed second switching element J of the planetary gearset PS1 to a housing as a pre-transmission ratio for the electric machine EM, or the ring gear HR1 is connected by means of a closed first switching element I to a transmission input shaft W1 as a superimposition transmission, wherein a planetary carrier PT1 is connected to a first spur gear plane 1 and is connected by means of a closed first shifting element A to the transmission input shaft W1, and wherein a sun gear SR1 is connected to the rotor of the electric machine EM.

In the context of the method according to the invention, a gear interval phi 1 for a gearshift between the gears with the lowest and second-lowest gear ratios is chosen to be smaller than a gear interval phi 2 between the gears with the highest and second-highest gear ratios.

The method claimed can preferably be used with the transmission described above and its embodiments.

INDEXES

1 First spur gear plane
2 Second spur gear plane
3 Third spur gear plane
4 Fourth spur gear plane
5 Fifth spur gear plane
A First shifting element, associated with the splitter group
B Second shifting element, associated with the splitter group
C Third shifting element, associated with the main transmission
D Fourth shifting element, associated with the main transmission
E Fifth shifting element, associated with the main transmission
F Sixth shifting element, associated with the main transmission
R Shifting element for reversing gears
KL Drive input constant of the splitter group in the slow mode
KH Drive input constant of the splitter group in the fast mode
L First range switching element
H Second range switching element
I First switching element of PS1
J Second switching element of PS1
W1 Drive input shaft or transmission input shaft
W2 Drive output shaft or transmission output shaft
W3 Main shaft
VGW Countershaft
GV Splitter group
HG Main transmission
GP Downstream range group in the form of a planetary gearset
phi 1 Smaller gear interval or transmission ratio interval
phi 2 Larger gear interval or transmission ratio interval
i Gear ratio of the respective gear
EM Electric machine
PS1 Planetary gearset of the electric machine
PS2 Planetary gearset of the range group
SR1 Sun gear of PS1
PT1 Planetary carrier of PS1
HR1 Ring gear of PS1
SR2 Sun gear of PS2
PT2 Planetary carrier of PS2
HR2 Ring gear of PS2
1. First gear of HG
2. Second gear of HG
3. Third gear of HG
4. Fourth gear of HG

The invention claimed is:

1. A transmission with a main transmission and at least one splitter group, the transmission comprising:
at least four spur gear planes formed with at least one countershaft and at least five shifting elements associated with the at least four spur gear planes for engaging at least six gears between a transmission input shaft and a transmission output shaft,
the at least six gears comprising a first-highest gear with a highest gear ratio, a second-highest gear with a second highest gear ratio, a third-highest gear with a third highest gear ratio, a first-lowest gear with a lowest gear ratio, a second-lowest gear with a second lowest gear ratio, and a third-lowest gear with a third lowest gear ratio,
when carrying out a gearshift between the first-highest gear and the second-highest gear, a shifting element change takes place for the shifting elements associated with the splitter group, but no shifting element change takes place for the shifting elements associated with the main transmission, and a gear interval between the first- and the second-highest gears is equal to a gear interval between the second- and the third-highest gears,
when carrying out a gearshift between the first-lowest gear and the second-lowest gear, a shifting element change takes place for the shifting elements associated with the main transmission, but no shifting element change takes place for the shifting elements associated with the splitter group, and a gear interval between the first- and the second-lowest gears is equal to a gear interval between the second- and the third-lowest gears, and
at least one shiftable electric machine being connectable to the transmission by a gearset such that, depending on a shifted position of the gearset, the gearset acts as a pre-transmission ratio for the electric machine or as a superimposition transmission.

2. The transmission according to claim 1, wherein the gearset is a planetary gearset, a ring gear of the planetary gearset is connectable, by a second switching element, to a housing as the pre-transmission ratio for the electric machine, or the ring gear is connectable, by a first switching element, to the transmission input shaft as a superimposition transmission, a planetary carrier is connected to a first spur gear plane and is connectable, by a first shifting element associated with the splitter group, to the transmission input shaft, and a sun gear is connected to a rotor of the electric machine.

3. The transmission according to claim 1, wherein, to obtain two further gears, a fifth spur gear plane with a sixth shifting element is associated with the main transmission.

4. The transmission according to claim 1, wherein a range group, in a form of a planetary gearset having a first range switching element and a second range switching element, is connected downstream from the main transmission such that at least four to six additional gears are obtained.

5. The transmission according to claim 1, wherein a further spur gear plane is provided for engaging at least one reversing gear.

6. The transmission according to claim 1, wherein to engage the first-highest gear, a first shifting element, associated with the splitter group, and a third or a fourth shifting element, associated with the main transmission, are engaged, and to engage the second-highest gear, a second shifting element, associated with the splitter group, and the third or the fourth shifting element, associated with the main transmission, are engaged.

7. The transmission according to claim 6, wherein to engage the second-lowest gear, the second shifting element, associated with the splitter group, and one of a fifth and a sixth shifting element, associated with the main transmission, are engaged, and to engage the first-lowest gear, the second shifting element, associated with the splitter group, and the other one of the fifth and the sixth shifting element, associated with the main transmission, are engaged.

8. A method of operating an automated transmission having a main transmission and at least one splitter group, at least four spur gear planes formed with at least one countershaft and at least five shifting elements associated with the at least four spur gear planes for engaging at least six gears between a transmission input shaft and a transmission output shaft, the at least six gears comprising a first-highest gear with a highest gear ratio, a second-highest gear with a second highest gear ratio, a third-highest gear with a third highest gear ratio, a first-lowest gear with a lowest gear ratio, a second-lowest gear with a second lowest gear ratio, and a third-lowest gear with a third lowest gear ratio, a gear interval between the first- and the second-highest gears is equal to a gear interval between the second- and the third-highest gears, and a gear interval between the first- and the second-lowest gears is equal to a gear interval between the second- and the third-lowest gears, the method comprising:
when carrying out a gearshift between the first-lowest gear and the second-lowest gear, changing shifting elements used and associated with the main transmission while not changing shifting elements used and associated with the splitter group,
when carrying out a gearshift between the first-highest gear and the second-highest gear ratio, changing the shifting elements used and associated with the splitter group while not changing the shifting elements used and associated with the main transmission, and
shiftably connecting an electric machine by a gearset such that depending on a connection of the gearset, the gearset is used as either a pre-transmission ratio for the electric machine or as a superimposition transmission.

9. The method according to claim 8, further comprising:
using a planetary gearset as the gearset, and a sun gear of the planetary gearset is connected to a rotor of the electric machine,
engaging a second switching element to connect a ring gear of the planetary gearset to a housing as the pre-transmission ratio for the electric machine, or engaging a first switching element to connect the ring gear of the planetary gearset to the transmission input shaft to form the superimposition transmission, and
connecting a planetary carrier of the planetary gearset to a first spur gear plane and connecting the planetary gearset to the transmission input shaft by engaging a first shifting element.

10. The method according to claim 8, further comprising configuring the gear interval for the gearshift between the first-lowest gear and the second-lowest gear as being smaller than the gear interval for the gearshift between the first-highest gear and the second-highest gear.

11. A transmission with a main transmission and at least one splitter group located upstream of the main transmission, the transmission comprising:
at least first, second, third and fourth spur gear planes formed with at least one countershaft, and at least first, second, third, fourth and fifth shifting elements being associated with one of the first, the second, the third and the fourth spur gear planes for engaging at least six gears between a transmission input shaft and a transmission output shaft, the first and the second shifting elements being associated with the splitter group, and the third, the fourth and the fifth shifting elements being associated with the main transmission;
the at least six gears comprising a first-highest gear with a highest gear ratio, a second-highest gear with a second highest gear ratio, a third-highest gear with a third highest gear ratio, a first-lowest gear with a lowest gear ratio, a second-lowest gear with a second lowest gear ratio, a gear interval between the first- and the second-highest gears is equal to a gear interval between the second- and the third-highest gears, and a gear interval between the first- and the second-lowest gears is equal to a gear interval between the second- and the third-lowest gears,
a gearshift being carried out between the first-highest gear and the second-highest gear ratio, by engaging one of the first and the second shifting elements and disengaging the other one of the first and the second shifting elements, and maintaining engagement or disengagement of the third, the fourth and the fifth shifting elements;
a gearshift being carried out between the first-lowest gear and the second-lowest gear, by engaging one of the third, the fourth and the fifth shifting elements and disengaging another one of the third, the fourth and the fifth shifting elements, while maintaining engagement or disengagement of the first and the shifting elements; and
at least one shiftable electric machine being connectable by a gearset such that, depending on a shifted position of the gearset, the gearset acts either as a pre-transmission ratio for the electric machine or as a superimposition transmission.

* * * * *